United States Patent
Wiskerke et al.

(10) Patent No.: US 8,200,339 B2
(45) Date of Patent: Jun. 12, 2012

(54) IMPLANTABLE MICROPHONE FOR AN IMPLANTABLE HEARING PROTHESIS

(75) Inventors: Pieter Wiskerke, Antwerp (BE); Wim Bervoets, Wilrijk (BE)

(73) Assignee: Cochlear Limited, Macquarie University, NSW (AU)

( * ) Notice: Subject to any disclaimer, the term of this patent is extended or adjusted under 35 U.S.C. 154(b) by 389 days.

(21) Appl. No.: 12/578,384

(22) Filed: Oct. 13, 2009

(65) Prior Publication Data
US 2010/0092021 A1    Apr. 15, 2010

(51) Int. Cl.
*A61N 1/375* (2006.01)
(52) U.S. Cl. .............................. 607/57; 607/36
(58) Field of Classification Search ........................ None
See application file for complete search history.

(56) References Cited

U.S. PATENT DOCUMENTS

| | | | |
|---|---|---|---|
| 4,243,042 A * | 1/1981 | Ware ............................... | 607/36 |
| 5,881,158 A * | 3/1999 | Lesinski et al. ................ | 381/174 |
| 6,516,228 B1 * | 2/2003 | Berrang et al. ................. | 607/57 |
| 6,736,771 B2 * | 5/2004 | Sokolich et al. ................ | 600/25 |
| 7,204,799 B2 * | 4/2007 | Miller et al. .................... | 600/25 |
| 7,214,179 B2 | 5/2007 | Miller, III et al. | |
| 7,241,258 B2 | 7/2007 | Miller, III et al. | |
| 7,489,793 B2 * | 2/2009 | Miller et al. ................... | 381/361 |
| 2005/0197524 A1 | 9/2005 | Miller et al. | |
| 2005/0245983 A1 * | 11/2005 | Kast et al. ....................... | 607/36 |

FOREIGN PATENT DOCUMENTS

JP    2003347448 A    12/2003

* cited by examiner

*Primary Examiner* — Kennedy Schaetzle
(74) *Attorney, Agent, or Firm* — Kilpatrick, Townsend & Stockton, LLP.

(57) ABSTRACT

An implantable microphone for a hearing prosthesis. The microphone comprises: a housing having a diaphragm chamber formed therein, and an aperture extending from the exterior surface of the housing to the chamber; a diaphragm disposed on the exterior of the housing so as to seal the aperture, and configured to vibrate in response to sound signals; a sensor positioned adjacent an end of the chamber opposing the diaphragm, and configured to detect vibration of the diaphragm, and to generate electrical signals based thereon; and a stiffening material substantially filling the regions of the housing external to the sensor and the diaphragm such that that air gaps within the filled regions of the housing are substantially eliminated, wherein the stiffening material has an elastic modulus that enables the housing to substantially resist deformation there of in response to body-noise.

22 Claims, 6 Drawing Sheets

IMPLANTABLE MICROPHONE FOR AN IMPLANTABLE HEARING PROTHESIS

CROSS-REFERENCE TO RELATED APPLICATIONS

The present invention claims the benefit of Australian Provisional Application No. 2008905288; filed Oct. 13, 2008. The content of this application is hereby incorporated by reference herein.

BACKGROUND

1. Field of the Invention

The present invention relates generally to an implantable hearing prosthesis and, more particularly, to an implantable microphone for an implantable hearing prosthesis.

2. Related Art

Medical devices having one or more implantable components, generally referred to as implantable medical devices, have provided a wide range of therapeutic benefits to patients over recent decades. One type of implantable medical devices, implantable hearing prostheses, treat the hearing loss of a prosthesis recipient are one particular type of implantable medical devices that are widely used today.

Hearing loss, which may be due to many different causes, is generally of two types, conductive and sensorineural. In some cases, a person suffers from hearing loss of both types. Conductive hearing loss occurs when the normal mechanical pathway that sound travels to reach the cochlea is impeded, for example, by damage to the ossicles. Individuals suffering from conductive hearing loss typically have some form of residual hearing because the hair cells in the cochlea are undamaged. As a result, individuals suffering from conductive hearing loss typically receive an implantable hearing prosthesis, such as an acoustic hearing aid, middle ear implant, etc., that generates mechanical motion of the cochlea fluid.

In many people who are profoundly deaf, however, the reason for their deafness is sensorineural hearing loss. Sensorineural hearing loss occurs when there is damage to the inner ear, or to the nerve pathways from the inner ear to the brain. As such, those suffering from some forms of sensorineural hearing loss are thus unable to derive suitable benefit from hearing prostheses that generate mechanical motion of the cochlea fluid. Such individuals may benefit from implantable hearing prostheses that deliver electrical stimulation to nerve cells of the recipient's auditory system. As used herein, a recipient's auditory system includes all sensory system components used to perceive a sound signal, such as hearing sensation receptors, neural pathways, including the auditory nerve and spiral ganglion, and the regions of the brain used to sense sounds. Electrically-stimulating hearing prostheses include, but are not limited to, auditory brain stimulators and cochlear implants.

Cochlear implants are often proposed when the sensorineural hearing loss is due to the absence or destruction of the cochlear hair cells which transduce acoustic signals into nerve impulses. Cochlear implants generally include a stimulating assembly implanted in the cochlea to deliver electrical stimulation signals to the auditory nerve cells, thereby bypassing absent or defective hair cells. The electrodes of the stimulating assembly differentially activate auditory neurons that normally encode differential pitches of sound.

Auditory brain stimulators are often proposed to treat a smaller number of individuals with bilateral degeneration of the auditory nerve. For such recipients, an auditory brain stimulator provides stimulation of the cochlear nucleus in the brainstem.

Totally or fully implantable forms of the above and other implantable hearing prostheses have been developed to treat a recipient's conductive, sensorineural and/or combination hearing loss. As used herein, a totally implantable hearing prosthesis refers to a device in which all of the components of the device are implanted subcutaneously; that is there are no external components. One exemplary totally implantable cochlear implant is described in greater detail in U.S. Pat. No. 7,346,397, which is hereby incorporated by reference herein.

Unlike conventional hearing prostheses in which microphones are positioned external to the recipient, a totally implantable hearing prosthesis includes a subcutaneously-implanted microphone. An implanted microphone may be sensitive to airborne sound, referred to herein as air-conducted sound, as well as sound conducted to the microphone via the bones, tissue, etc. of the recipient's head, referred to herein as body-noise.

SUMMARY

In one aspect of the present invention, an implantable microphone is provided. The implantable microphone comprises: a housing having a diaphragm chamber formed therein, and an aperture extending from the exterior surface of the housing to the chamber; a diaphragm disposed on the exterior of the housing so as to seal the aperture, and configured to vibrate in response to sound signals; a sensor positioned adjacent an end of the chamber opposing the diaphragm, and configured to detect vibration of the diaphragm, and to generate electrical signals based thereon; and a stiffening material substantially filling the regions of the housing external to the sensor and the diaphragm such that that air gaps within the filled regions of the housing are substantially eliminated, wherein the stiffening material has an elastic modulus that enables the housing to substantially resist deformation thereof in response to body-noise.

In another aspect of the present invention, a method of manufacturing an implantable microphone is provided. The method comprises: providing a housing having a diaphragm chamber formed therein, and an aperture extending from the exterior surface of the housing to the chamber; positioning a sensor in the housing so as to be adjacent an end of the diaphragm chamber opposing the diaphragm; and substantially filling the housing with a stiffening material such that that air gaps within the filled regions of the housing are substantially eliminated, wherein the stiffening material has an elastic modulus that enables the housing to substantially resist deformation thereof in response to body-noise.

BRIEF DESCRIPTION OF THE DRAWINGS

Embodiments of the present invention are described below with reference to the attached drawings, in which.

DETAILED DESCRIPTION

Figure 1:
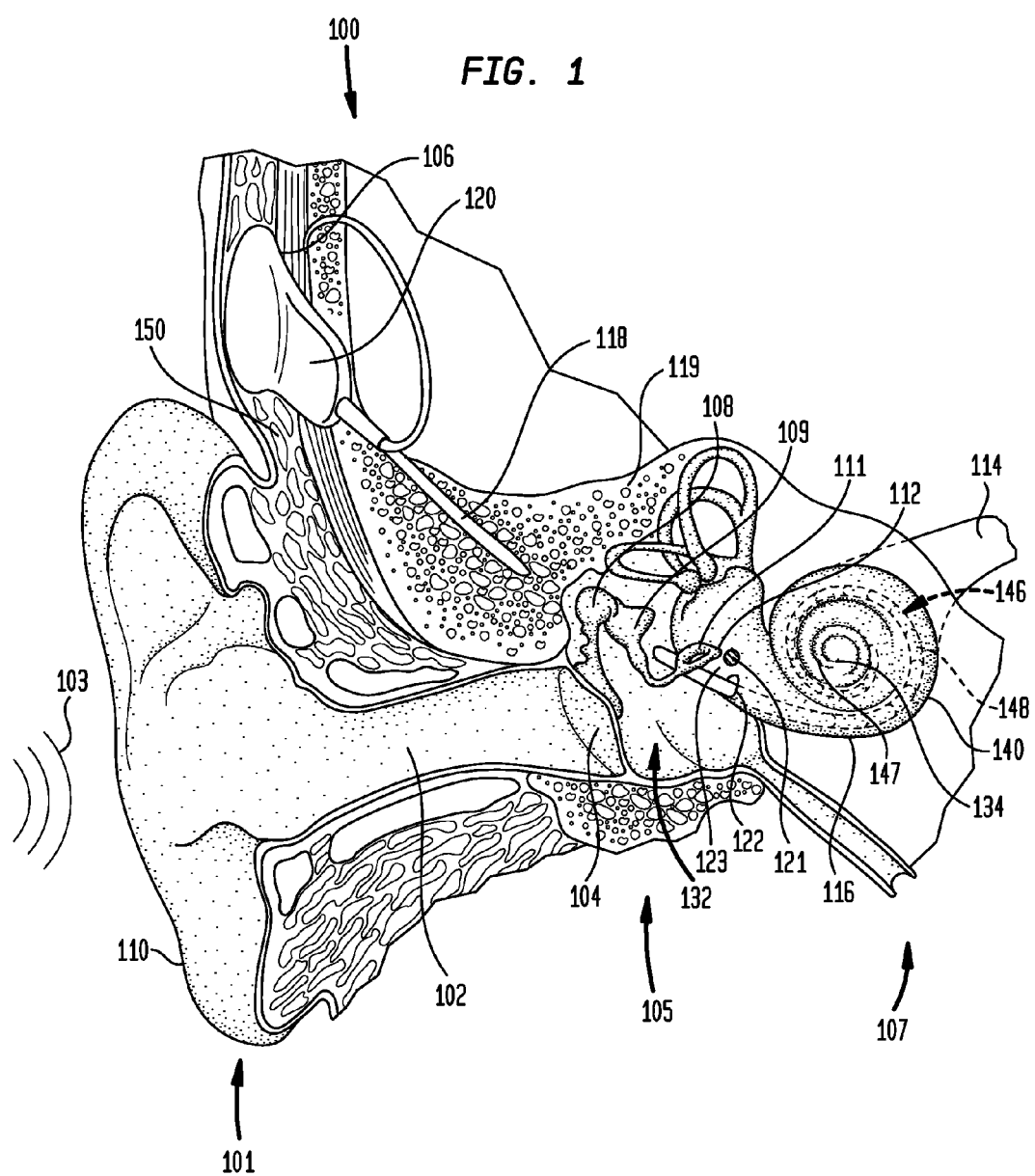
FIG. 1 is a perspective view of an exemplary totally implantable cochlear implant, in which embodiments of the present invention may be implemented.

Aspects of the present invention are generally directed to a subcutaneous microphone for an implantable hearing prosthesis. The subcutaneous microphone is implanted under a recipient's skin and/or tissue so as to receive a desired acoustic sound signal. The microphone comprises a housing having a diaphragm chamber formed therein, and an aperture extending from the exterior surface of the housing to the chamber. A diaphragm is disposed on the exterior of the housing so as to seal the aperture. The diaphragm is configured to receive sound signals and a sensor is positioned at an end of the chamber opposing the diaphragm so as to detect vibration, deflection, etc. of the diaphragm. A stiffening material substantially fills the regions of the housing external to the sensor such that that air gaps within the filled regions are substantially eliminated.

As described below, embodiments of the present invention may utilize different stiffening materials to substantially fill the regions of the microphone housing external to the sensor and diaphragm chamber. Stiffening materials in accordance with embodiments of the present invention have or following a curing processes will have, a desired elastic modulus (E), sometimes referred to as Young's modulus, that enables the microphone housing to substantially resist deformation in response to body-noises. The stiffening material may also have a desired density such that the substantially filled microphone has a mass that resists movement in response to body-noises. In certain embodiments, a biocompatible epoxy having the above properties is used as the stiffening material. Other stiffening materials that have a desired density and elastic modulus may also be utilized in embodiments of the present invention. Exemplary such materials include, but are not limited to, thermoset polymers, thermoplastic polymers, rubber (vulcanized, synthetic, silicone or natural), Bakelite®, phenol-formaldehyde, urea-formaldehyde, melamine resin and polyimides, etc.

As used herein, a subcutaneous or implantable microphone is defined as a device implantable under the skin and/or tissue of a recipient so as to receive an acoustic sound signal (sound waves) originating external to the recipient, and which converts the acoustic sound signal into electrical signals. Implantable microphones in accordance with embodiments of the present invention are described herein primarily in connection with one type of implantable hearing prosthesis, namely a totally or fully implantable cochlear prosthesis (commonly referred to as a cochlear prosthetic device, cochlear implant, cochlear device, and the like; simply "cochlear implants" herein). As used herein, a totally implantable cochlear implant refers to an implant that is capable of operating, at least for a finite period of time, without an external device. It would be appreciated that embodiments of the present invention may also be implemented in a cochlear implant that includes one or more external components. It would be further appreciated that embodiments of the present invention may be implemented in any partially or fully implantable hearing prosthesis now known or later developed, including, but not limited to, acoustic hearing aids, auditory brain stimulators, middle ear mechanical stimulators, hybrid electro-acoustic prosthesis or other prosthesis that electrically, acoustically and/or mechanically stimulate components of the recipient's outer, middle or inner ear.

FIG. 1 is perspective view of a totally implantable cochlear implant, referred to as cochlear implant 100, implanted in a recipient. The recipient has an outer ear 101, a middle ear 105 and an inner ear 107. Components of outer ear 101, middle ear 105 and inner ear 107 are described below, followed by a description of cochlear implant 100.

In a fully functional ear, outer ear 101 comprises an auricle 110 and an ear canal 102. An acoustic pressure or sound wave 103 is collected by auricle 110 and channeled into and through ear canal 102. Disposed across the distal end of ear cannel 102 is a tympanic membrane 104 which vibrates in response to sound wave 103. This vibration is coupled to oval window or fenestra ovalis 112 through three bones of middle ear 105, collectively referred to as the ossicles 132 and comprising the malleus 108, the incus 109 and the stapes 111. Bones 108, 109 and 111 of middle ear 105 serve to filter and amplify sound wave 103, causing oval window 112 to articulate, or vibrate in response to vibration of tympanic membrane 104. This vibration sets up waves of fluid motion of the perilymph within cochlea 140. Such fluid motion, in turn, activates tiny hair cells (not shown) inside of cochlea 140. Activation of the hair cells causes appropriate nerve impulses to be generated and transferred through the spiral ganglion cells (not shown) and auditory nerve 114 to the brain (also not shown) where they are perceived as sound.

Cochlear implant 100 comprises a main implantable component 120 implanted in the recipient. Main implantable component 120 comprises a hermetically sealed, biocompatible housing 106, an implantable microphone (not shown) configured to receive sound signals, and a sound processing unit (also not shown) to process the sound signals received by the implantable microphone. Main implantable component 120 further includes a stimulator unit (also not shown) which generates electrical stimulation signals based on the processed microphone signals.

The electrical stimulation signals generated by the stimulator unit are delivered to the recipient via elongate stimulating lead assembly 118. Elongate stimulating lead assembly 118 has a proximal end connected to main implantable component 120, and a distal end implanted in cochlea 140. Stimulating lead assembly 118 extends from main implantable component 120 to cochlea 140 through mastoid bone 119. In some embodiments stimulating lead assembly 118 may be implanted at least in basal region 116 of cochlea 140, and sometimes further. For example, stimulating lead assembly 118 may extend towards apical end of cochlea 140, referred to as cochlea apex 134. In certain circumstances, stimulating lead assembly 118 may be inserted into cochlea 140 via a cochleostomy 122. In other circumstances, a cochleostomy may be formed through round window 121, oval window 112, the promontory 123 or through an apical turn 147 of cochlea 140.

Stimulating lead assembly 118 comprises a longitudinally aligned and distally extending array 146 of electrodes 148, sometimes referred to as electrode array 146 herein, disposed along a length thereof. Although electrode array 146 may be disposed on stimulating lead assembly 118, in most practical applications, electrode array 146 is integrated into stimulating lead assembly 118. As such, electrode array 146 is referred to herein as being disposed in stimulating lead assembly 118. The stimulation signals generated by the stimulator unit are applied by electrodes 148 to cochlea 140, thereby stimulating auditory nerve 114.

As described in greater detail below, main implantable component 120 may further comprises a receiver or transceiver unit configured to receive data and/or power signals from an external device (not shown). In the embodiments of FIG. 1, the receiver or transceiver unit is positioned in housing 106, and main implantable component 120 is referred to as a stimulator/receiver unit 120.

As noted, cochlear implant 100 comprises a totally implantable prosthesis that is capable of operating, at least for a finite period of time, without the need for an external device. Therefore, cochlear implant 100 further comprises a rechargeable power source (not shown) that stores power received from an external device. The power source may comprise, for example, a rechargeable battery. During operation of cochlear implant 100, the power stored by the power source is distributed to the various other implanted components as needed. The power source may be located in main implantable component 120, or disposed in a separate implanted location.

In the embodiments of FIG. 1, the implantable microphone is positioned in main implantable component 120. As described in greater detail below, the implantable microphone may also be implanted in other locations outside of main implantable component 120.

Figure 2:
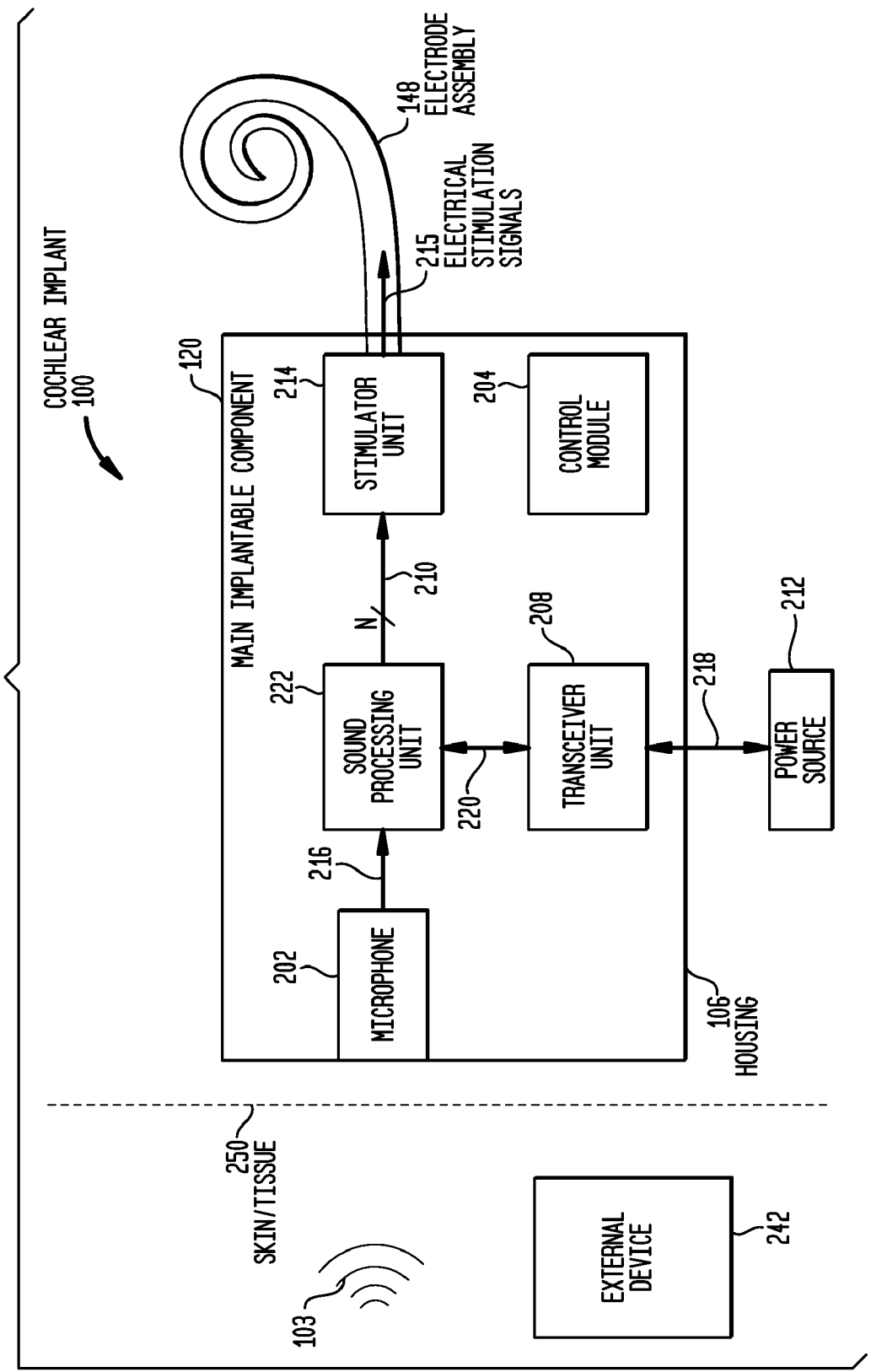
FIG. 2 is a schematic functional block diagram of the totally implant cochlear implant of FIG. 1 in accordance with embodiments of the present invention.

FIG. 2 is a functional block diagram of embodiments of cochlear implant 100 in which embodiments of the present invention may be implemented. As noted above, cochlear implant 100 is totally implantable; that is, all components of cochlear implant 100 are configured to be implanted under skin/tissue 250 of a recipient. Because all components of cochlear implant 100 are implantable, cochlear implant 100 operates, for at least a finite period of time, without the need of an external device.

As noted, cochlear implant 100 includes a main implantable component 120 having a hermetically sealed, biocompatible housing 106. Disposed in main implantable component 120 is a microphone 202 configured to sense a sound signal 103. Microphone 202 may include one or more components to pre-process the microphone output. Details of exemplary microphones in accordance with embodiments of the present invention are described below with reference to FIGS. 3-5.

An electrical signal 216 representing sound signal 103 detected by microphone 202 is provided from the microphone to sound processing unit 222. Sound processing unit 222 implements one or more speech processing and/or coding strategies to convert the pre-processed microphone output into data signals 210 for use by stimulator unit 214. Stimulator unit 214 utilizes data signals 210 to generate electrical stimulation signals 215 for delivery to the cochlea of the recipient. In the embodiment illustrated in FIG. 2, cochlear implant 100 comprises stimulating lead assembly 118 for delivering stimulation signal 215 to the cochlea.

Cochlear implant 100 also includes a rechargeable power source 212. Power source 212 may comprise, for example, one or more rechargeable batteries. As described below, power is received from an external device, such as external device 242, and is stored in power source 212. The power may then be distributed to the other components of cochlear implant 100 as needed for operation.

Main implantable component 120 further comprises a control module 204. Control 204 includes various components for controlling the operation of cochlear implant 100, or for controlling specific components of cochlear implant 100. For example, controller 204 may control the delivery of power from power source 212 to other components of cochlear implant 100. For ease of illustration, main implantable component 120 and power source 212 are shown separate. It would be appreciated that power source 212 may be integrated into a hermetically sealed housing 206.

As noted above, cochlear implant 100 further comprises a receiver or transceiver unit that permits cochlear implant 100 to receive and/or transmit signals to an external device. For ease of illustration, cochlear implant 100 is shown having a transceiver unit 208 in main implantable component 120. It would be appreciated that embodiments of the present invention may include a receiver or transceiver unit which implanted elsewhere in the recipient outside of main implantable component 120.

Transceiver unit 208 is configured to transcutaneously receive power and/or data from external device 242. As used herein, transceiver unit 208 refers to any collection of one or more implanted components which form part of a transcutaneous energy transfer system. Furthermore, transceiver unit 208 includes any number of component(s) which receive and/or transmit data or power, such as, for example a coil for a magnetic inductive arrangement, an antenna for an alternative RF system, capacitive plates, or any other suitable arrangement. As such, in embodiments of the present invention, various types of energy transfer, such as infrared (IR), electromagnetic, capacitive and inductive transfer, may be used to transfer the power and/or data from external device 242 to cochlear implant 100.

As noted, transceiver unit 208 receives power and/or data from external device 242. In the illustrative arrangement of FIG. 2, external device 242 comprises a power source (not shown) disposed in a Behind-The-Ear (BTE) unit. External device 242 also includes components of a transcutaneous energy transfer link formed with transceiver unit 208 to transfer the power and/or data to cochlear implant 100. It should be appreciated that the external device shown in FIG. 2 is merely illustrative, and other external devices may be used with embodiments of the present invention.

As noted above, totally implantable hearing prostheses use a subcutaneous microphone to detect sound waves originating external to a recipient, sometimes referred to herein as acoustic sound signals. Also as noted above, an implanted microphone may be sensitive to both acoustic or air-borne sound signals original external to the recipient (sometimes referred to herein as air-conducted sound) as well as body-borne sound (sometimes referred to herein as body-noise). However, generally only the air-conducted sounds are useful in evaluating a desired sound signal originating external to the recipient, and the body-noise signals typically comprises noise that degrades performance of the microphone. For example, body-noise, such as breathing, chewing, muscle movements, speaking, etc. may be conducted through the recipient's skull to the implanted microphone. The body-noise detected by the microphone may have an amplitude which is the same, or greater than the amplitude of a concurrently-received air-conducted sound. In such situations, the implanted microphone detects both the desired air-conducted sound as well as the body-conducted noise, and the hearing prosthesis is unable to differentiate between the sounds.

As would be appreciated, subcutaneous microphones generally include a diaphragm positioned adjacent to the recipient's skin or tissue. Vibrations resulting from body-noise accelerate or force the diaphragm of the implanted microphone against the skin/tissue. The contact of the skin/tissue with the diaphragm results in an increased sensitivity of the microphone to the body-noises. Furthermore, body-noises may also result in elastic deformation of the microphone, causing the diaphragm to flex and vibrate resulting in a further increase in the detected body-noise.

Furthermore, an implantable microphone may suffer from sound degradation as a result of system noise. System noise is electrical noise from components of the microphone such as the pre-amplifier, as well as unidentifiable acoustical noise.

Figure 3:
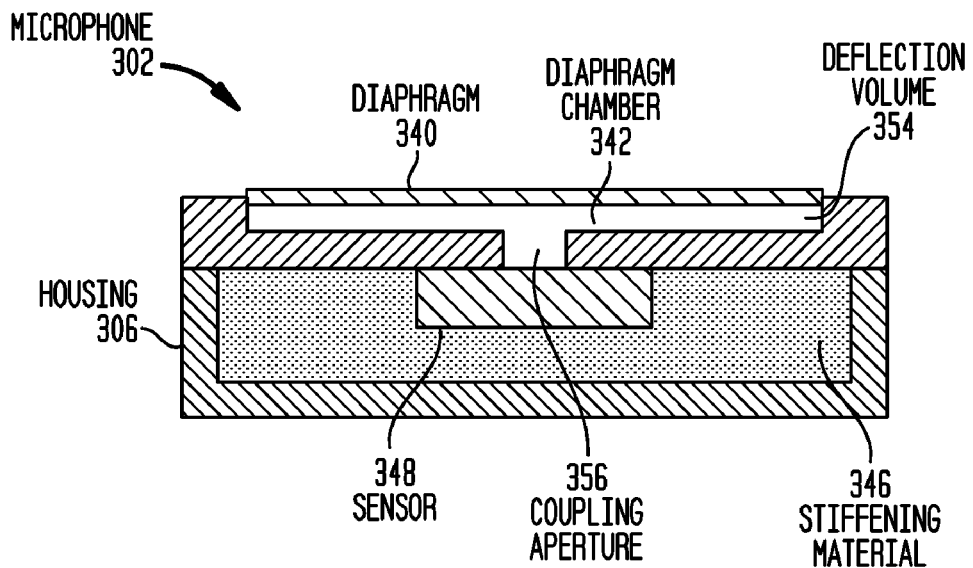
FIG. 3 is a cross-sectional side view of an implantable microphone in accordance with embodiments of the present invention.

FIG. 3 is a cross-sectional view of an implantable microphone 302 in accordance with embodiments of the present invention having reduced sensitivity to system body-noise and other noise contributors. As shown, microphone 302 comprises a microphone housing 306 having a titanium diaphragm 340 attached to the surface thereof. In the illustrative embodiment of FIG. 3, diaphragm 340 is laser welded to housing 306. However, it would be appreciated that diaphragm 340 may be attached to housing other joining methods such as arc welding, resistance welding, electron beam welding, ultrasonic welding, using adhesives, etc. Furthermore, it would be appreciated that diaphragm 340 may have such as circular, oval or rectangular shapes depending on the requirements of the microphone. Similarly, it would be appreciated that a number of different materials may be used to form diaphragm 340, and the thickness of the diaphragm may vary.

Diaphragm 340 seals an aperture of an air- or gas-filled cavity formed in housing 306, referred to as diaphragm chamber 342. In the illustrative embodiment of FIG. 3, diaphragm chamber 342 includes a deflection volume 354 that permits vibration of diaphragm 340. Diaphragm chamber 342 also comprises a coupling aperture 356 extending from deflection volume 354 at an end of the volume opposing the aperture. As noted, diaphragm chamber may be filled with air or a gas such as helium, argon, a helium/argon mixture, etc.

Positioned adjacent to coupling aperture 356 is a transducer or sensor 348. Sensor 348 is configured to detect the vibration of diaphragm 340, and to generate electrical signals based thereon. As noted above, these electrical signals, sometimes referred to as microphone outputs herein, may be further processed by the hearing prosthesis for use in electrically, mechanically or acoustically stimulating the recipient. As described in greater detail below, a number of different types of sensors may be implemented in embodiments of the present invention to generate the electrical signals.

Microphone 302 further comprises a stiffening material 346 which substantially fills housing 306. That is, stiffening material 346 substantially fills the regions of housing 306 external to sensor 348 and diaphragm chamber 342 such that that air gaps within the filled regions of the housing are substantially eliminated. Stiffening material 356 has an elastic modulus that enables housing 306 to substantially resist deformation thereof in response to body-noise. Furthermore, in certain embodiments, stiffening material 346 has a density such that the substantially filled microphone has a mass that resists movement in response to body-noises. As such, stiffening material 346 in accordance with embodiments of the present invention increases the relative mass of microphone 302, and reduces the compliance of microphone housing 306.

As noted, stiffening materials in accordance with embodiments of the present invention have or following a curing processes will have, a desired elastic modulus (E), sometimes referred to as Young's modulus, that enables housing 306 to substantially resist deformation thereof in response to body-noises. The desired elastic modulus may vary depending on, for example, the material used to form housing 306, the size of housing 306, etc.

The stiffening material may also have a desired density such that the substantially filled microphone has a mass that resists movement in response to body-noises. For example, for a microphone 302 of a particular size and having a housing formed from a particular material, a stiffening material 346 having a density greater than 1000 kg/m$^3$ may provide a mass that is sufficient for microphone 302 to resist movement in response to body-noise. Other suitable densities may depend on, for example, the size of housing 306, etc.

A number of stiffening materials that have a desired density and elastic modulus may also be utilized in embodiments of the present invention. For example, in certain embodiments, a two component thermo-set material having the above properties, such as a biocompatible epoxy, is used as stiffening material 346. As would be appreciated, exemplary epoxies would be introduced into housing 306 in a liquid form and would be cured to a solid material. Certain exemplary biocompatible epoxies cure at room temperature. Exemplary other suitable materials that may have a desired density and elastic modulus include, but are not limited to, thermoset polymers, thermoplastic polymers, rubber (vulcanized, synthetic, silicone or natural), Bakelite®, phenol-formaldehyde, urea-formaldehyde, melamine resin and polyimides, etc.

The placement of stiffening material 346 into microphone 302 provides a number of advantages. For example, stiffening material 346 provides microphone 302 with an increased stiffness and rigidity when compared to a microphone in which the housing is vacant. Due to this added stiffness and rigidity, housing 306 is resistant to small elastic deformations caused by body movement which would result in flexure or deformation of diaphragm 340. Such flexures/deformation caused by body movement would result in higher amount of body-noise being detected by sensor 348. Thus, elimination or reduction of the susceptibility of diaphragm 340 to such flexure/deformation decreases the sensitivity of microphone 302 to body-noise when compared to systems that are not substantially filled with a stiffening material.

As noted above, implantable microphones may also be susceptible to body-noise resulting from acceleration of a diaphragm against adjacent skin or tissue. Microphone 302 having stiffening material 346 within housing 306 has increased density and weight when compared to a microphone in which housing 306 is vacant. As a result, the accelerations of implantable microphone 302 against skin/tissue are lower than a vacant microphone.

Also as noted above, microphones may be susceptible to system noise, such as electrical noise or noise resulting from resonance of microphone components such as wires. In the embodiments of FIG. 3, any components within microphone housing 306, such as wires, pre-amplifiers, etc., are sealed within stiffening material 346. This sealing prevents such components from resonating, as well as eliminates reflective surfaces that facilitate resonance, thereby further reducing the sensitivity of the microphone to acoustic and system.

Another advantage of stiffening material 346 is an increase in reliability of microphone 302 over microphones having vacant housings. As noted, any components within microphone housing 306, such as wires, pre-amplifiers, etc., are sealed within stiffening material 346. In the event of the ingress of body fluids into microphone 302, the sealing provided by stiffening material 346 prevents fluids from causing degradation or failure of the sensor 348 or any associated wiring or electronic components. Similarly, any potential toxic material in the microphone components is prevented from coming into contact with body tissue or fluids.

In certain embodiments, stiffening material 348 also has an elastic modulus and/or density that increases the impact resistance of microphone system 302. Specifically, in the event of a severe impact to the implanted microphone, stiffening material 348 has an elastic modulus and/or density that enables housing 306 to resist collapsing inwardly as a result of diaphragm deformation.

In alternative embodiments, stiffening material 348 also has dielectric properties that serve as an insulator which may prevent short circuit in case the insulation of wires or other components is damaged during, for example, the manufacturing process.

As noted above, in certain embodiments of the present invention microphone 302 is be positioned at least partially inside another implantable component, such as a main implantable component. In such embodiments, diaphragm 340 is formed into the exterior surface of the main implantable component that also includes the sound processing unit, stimulator unit, etc. In other embodiments of the present invention, microphone 302 forms an independent biocompatible and hermetic sealable element. In such embodiments, housing 306 is formed from a biocompatible material such as titanium, steel, etc., and diaphragm 340 is secured thereto to hermetically seal sensor 348, stiffening material 346, etc.

Figure 4A:
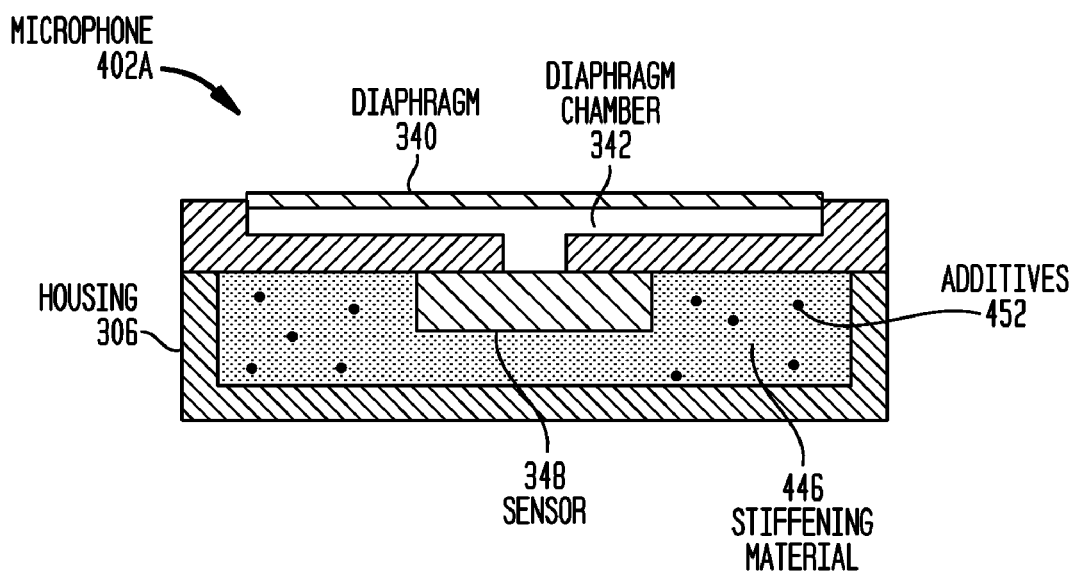
FIG. 4A is a cross-sectional side view of an implantable microphone in accordance with embodiments of the present invention.

FIG. 4A is a cross-sectional view of a microphone 402A in accordance with further embodiments of the present invention. Similar to the embodiments of FIG. 3 described above, microphone 402A comprises a diaphragm 340 sealing an aperture a diaphragm chamber 342, and a sensor 348 adjacent a second end of the diaphragm chamber opposing the diaphragm. Housing 306 is substantially filled with a stiffening material 446 having an elastic modulus that enables housing 306 to resist deformation in response to body-noise Stiffening material 446 is substantially similar to stiffening material 346 described above with reference to FIG. 3. However, as shown in FIG. 4A, stiffening material 446 has disposed therein additives 452 formed from materials that have a weight and/or density that exceeds that of stiffening material 446. Additives 452 increase the density of stiffening material 446 so as to further enable microphone 402A to resist movement in response to body-noise. In certain embodiments, tungsten or other metal additives are used to add mass to system 402A.

Figure 4B:
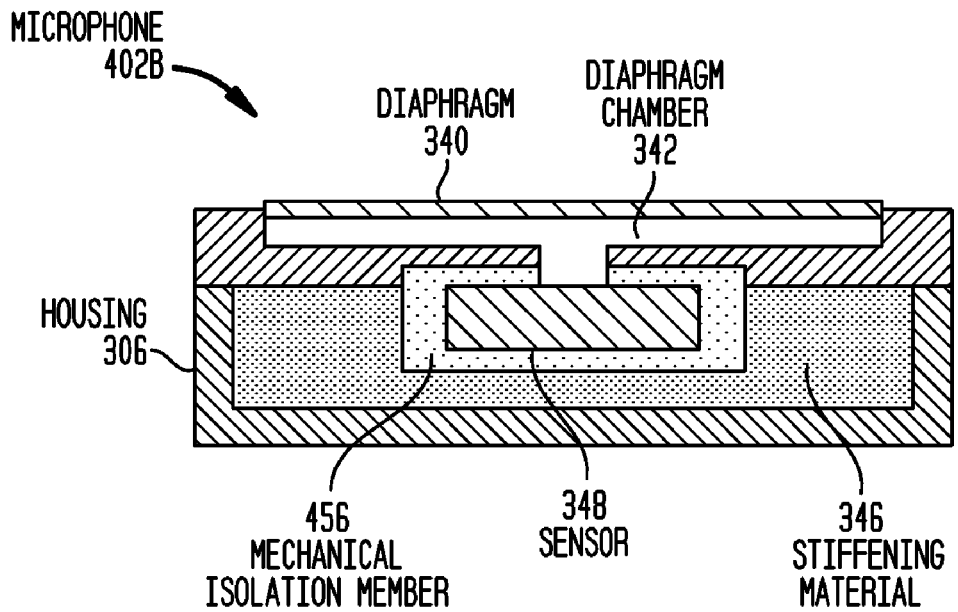
FIG. 4B is a cross-sectional side view of an implantable microphone in accordance with embodiments of the present invention.

FIG. 4B is a cross-sectional view of a still other microphone 402B in accordance with embodiments of the present invention. Similar to the embodiments described above, microphone 402B comprises a diaphragm 340 sealing an aperture of a diaphragm chamber 342 in housing 306. A sensor 348 is adjacent an end of diaphragm chamber 342 opposing diaphragm 340. Housing 306 is substantially filled with a stiffening material 346 having an elastic modulus that enables housing 306 to resist deformation of housing 306. In certain embodiments, stiffening material 346 also has a density that enables microphone 402B to resist movement thereof in response to body-noise.

In the embodiments of FIG. 4B, microphone 402B further comprises a mechanical isolation member 456 substantially surrounding sensor 348. Isolation member 456 comprises a flexible member which mechanically decouples sensor 348 from stiffening material 346. As such, isolation member 456 functions as a barrier which prevents vibrations from being transmitted from housing 306 through stiffening material 346 to sensor 348.

In the illustrative embodiment of FIG. 4B, isolation member 456 is formed from silicone. However, it would be appreciated that other elastomeric or resilient materials having the ability to prevent vibration from reaching sensor 348 such as, for example, polyurethane rubber may also be used.

As noted above, in certain embodiments of the present invention, stiffening material is in a liquid form when filling housing 306. When such stiffening materials are utilized, isolation member 456 functions to protect sensor 348 from ingress of this stiffening material prior to curing.

Figure 4C:
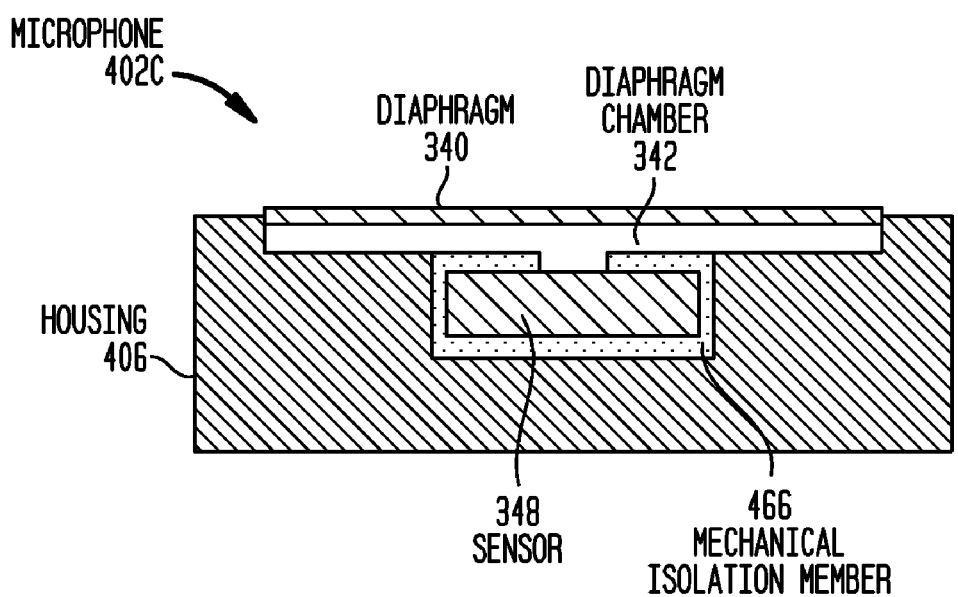
FIG. 4C is a cross-sectional side view of an implantable microphone in accordance with embodiments of the present invention.

FIG. 4C is a cross-sectional view of another microphone 402C in accordance with embodiments of the present invention. Similar to the embodiments described above, microphone 402C comprises a diaphragm 340 sealing an aperture of a diaphragm chamber 342 within a housing 406. A sensor 348 is adjacent an end of diaphragm chamber 342 opposing diaphragm 340.

In contrast to the above embodiments, in which the housings 306 include a vacant region in which sensor 348 is positioned, in the embodiments of FIG. 4C, housing 406 is shaped so that this vacant area is substantially or completely eliminated. That is, in the embodiments of FIG. 4C, housing 406 is shaped so that it fits closely about sensor 348 and another microphone components (not shown). Because housing 406 fits closely about sensor 348, housing 406 has a thickness that is sufficient to substantially resist deformation in response to body-noise. Similarly, due to the thickness of housing 406, microphone 406C has a larger mass that enables the microphone to resist movements in response to body-noise.

FIG. 4C illustrates specific embodiments in there is a small vacant area between housing 406 and sensor 348. In these embodiments, an isolation member 466 which is substantially the same as isolation 456 of FIG. 4C fills the small area between sensor 348 and housing 406. In alternative embodiments, this area between sensor 348 and housing 406 may be filled by a stiffening material. In such alternative embodiments, the stiffening material fills this region such that air gaps outside of sensor 348 and diaphragm chamber 342 are substantially eliminated. In still further embodiments, housing 406 is in contact with sensor 348 and there is no gap there between.

In the embodiments of FIG. 4C, housing 406 is milled from a single piece of stainless steel, titanium or other biocompatible material. In other embodiments, housing 406 is formed using, for example, selective laser sintering, turning or etching techniques. Because in the embodiments of FIG. 4C housing 406 is formed from a solid block of material, the housing as increased rigidity and stiffness when compared other microphone arrangements.

Figure 5:
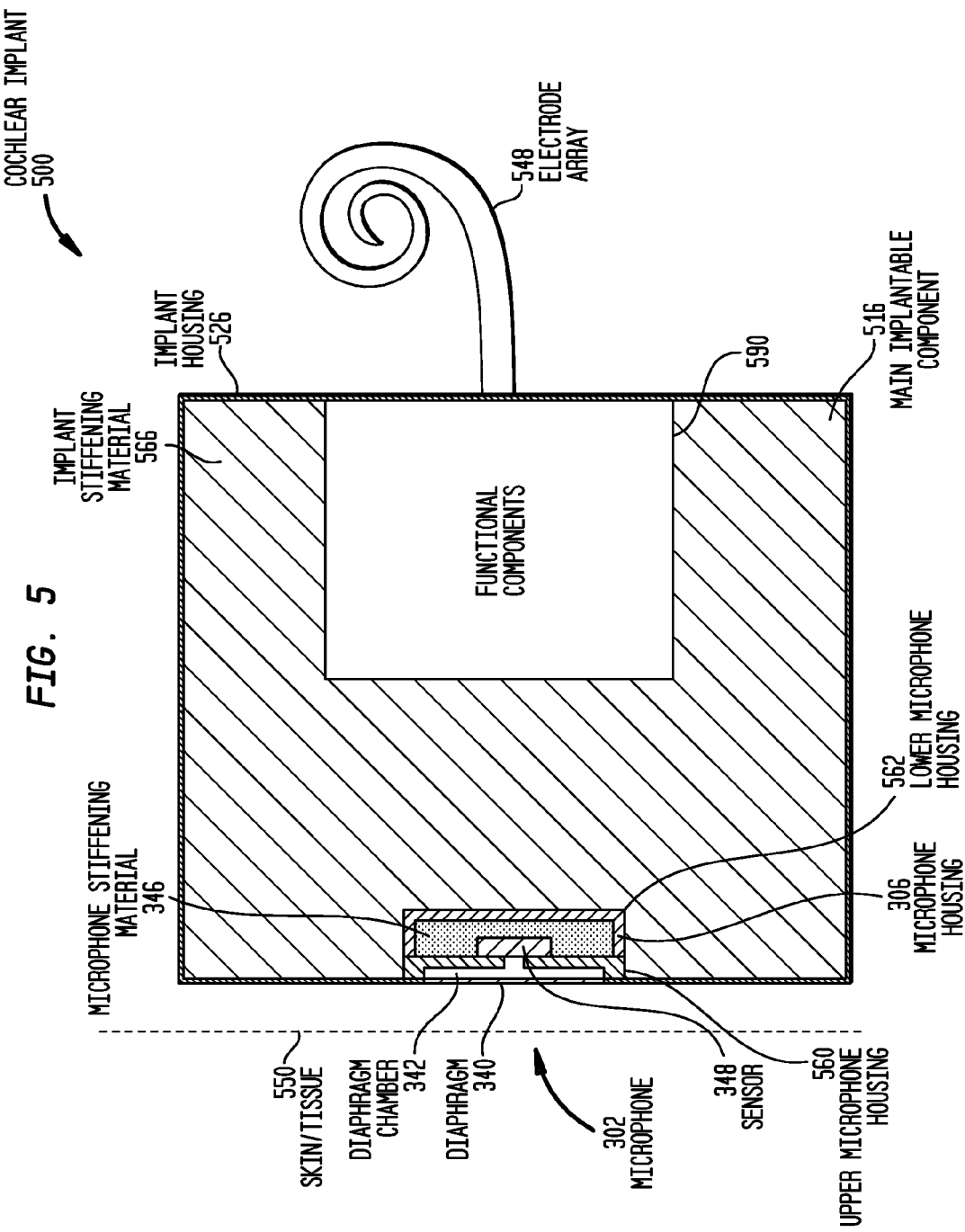
FIG. 5 is a schematic diagram of an exemplary totally implantable cochlear implant, in accordance with embodiments of the present invention.

As explained above, a microphone in accordance with embodiments of the present invention may be implanted in an implantable hearing prosthesis. FIG. 5 illustrates specific embodiments of the present invention in which microphone 302 of FIG. 3 is implemented as part of a cochlear implant 500. Cochlear implant 500 comprises a main implantable component 516 having a biocompatible, hermetically sealed implant housing 526. Positioned in main implantable component 516 is microphone 302. As described above, microphone 302 comprises a diaphragm 340. As shown in FIG. 5, diaphragm 340 forms a section of the exterior surface of implant housing 526. Diaphragm 340 is secured to implant housing 526 so as to maintain the hermetic seal of the main implantable component 516. Main implantable component 516 is implanted in the recipient so that diaphragm 340 is adjacent the skin/tissue 250 of the recipient.

As noted above, microphone 302 comprises housing 306 which is attached to the inner surface of implant housing 526. Microphone housing 306 includes an aperture extending to a diaphragm chamber 342. The aperture is sealed by diaphragm 340, and a sensor 348 is adjacent an end of the diaphragm chamber opposing diaphragm 340. As shown in FIG. 5, housing 306 is substantially filled with a stiffening material 446 that has an elastic modulus that enables microphone housing 306 to substantially resist deformation in response to body-noise. In certain embodiments, stiffening material 446 fills housing 306 such that air gaps outside of sensor 348 and diaphragm chamber 342 are substantially eliminated.

Main implantable component 516 further comprises one or more additional components for processing the output of the microphone 302, generating stimulation signals, controlling the operation of cochlear implant 500, etc. These various functional components are schematically shown as box 590 in FIG. 5. For ease of illustration electrical connections between microphone 302 and functional components 590 have been omitted. As shown, cochlear implant 500 further comprises an electrode array 548 for delivering electrical stimulation signals to the recipient's cochlea.

As noted above, microphone housing 306 is substantially filled with a stiffening material 346. In the embodiments of FIG. 5, main implantable component 516 is also filled with a stiffening material, referred to herein as implant stiffening material 566. Implant stiffening material 566 is substantially similar to stiffening material 346 described above.

FIG. 5 illustrates embodiments of the present invention in which microphone housing 306 comprises an upper housing 560 and a lower housing 562. Diaphragm chamber 340 is formed in upper housing 560, while lower housing 562 contains sensor 348 and is substantially filled with stiffening material 346. It would be appreciated that in alternative embodiments, lower housing 562 may be omitted. In such embodiments, sensor 348 would be surrounded by implant stiffening material 566. In still other embodiments, diaphragm chamber 340 may be formed in implant housing 526, and microphone housing 306 would be omitted.

As noted above, in alternative embodiments of the present invention, microphone 302 may comprise a module that is separate from main implantable component 516. In such embodiments, main implantable component 516 may still be substantially filled with stiffening material 566.

Figure 6:
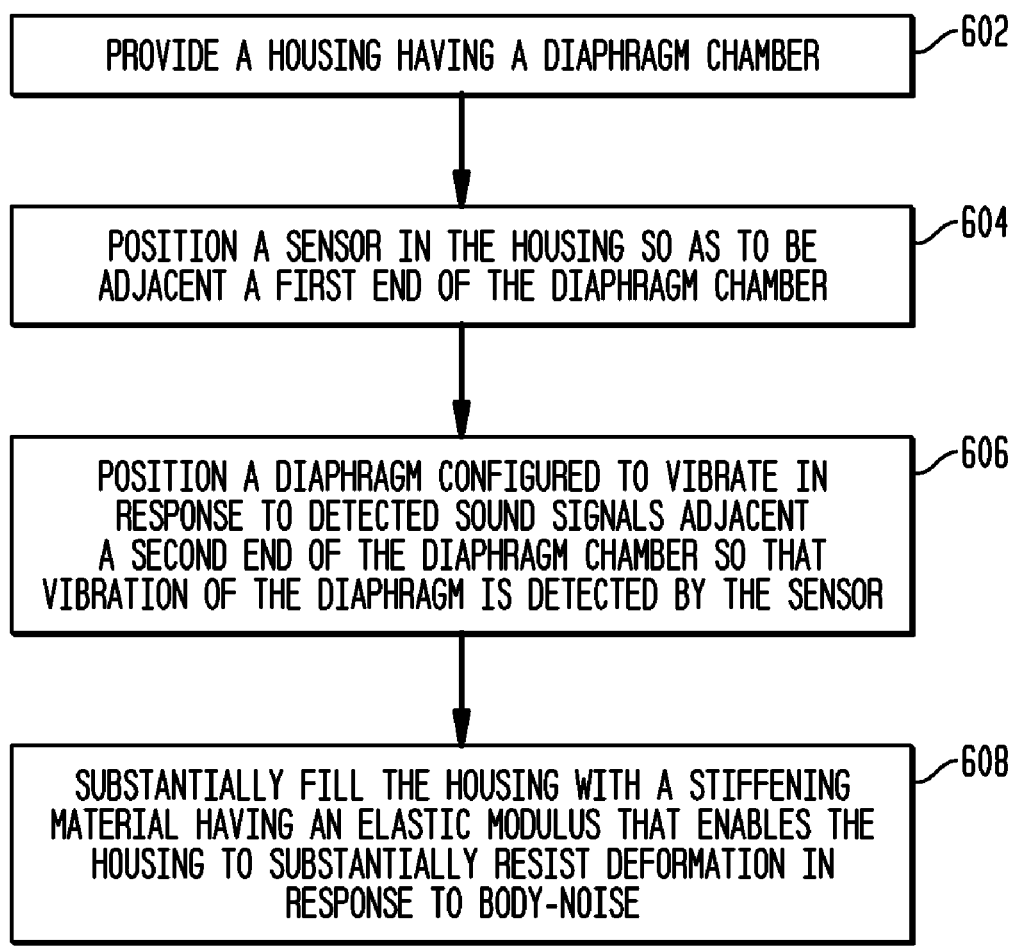
FIG. 6 is a flowchart illustrating a method for manufacturing an implantable microphone, in accordance with embodiments of the present invention.

FIG. 6 is flowchart illustrating a method 600 for manufacturing an implantable microphone in accordance with embodiments of the present invention. The method begins at block 602 with a housing having a diaphragm chamber therein is provided. The diaphragm chamber has an aperture extending to the exterior surface of the housing. As noted above, the provided housing may include only microphone components, including a sensor and/or associated electronics.

In certain embodiments, providing the housing includes forming the housing from a solid piece of biocompatible material. In other embodiments, providing the housing includes forming the housing from multiple pieces of biocompatible material.

At block 604 a sensor is positioned in the housing so as to be adjacent a first end of the diaphragm chamber. At block 606, a diaphragm is attached to the housing over a second end of the diaphragm chamber opposing the sensor. As such, vibration of the diaphragm in response to sound waves received thereby is detected by the sensor. The sensor generates electrical signals representative of the received sound waves.

At block 608, the housing is substantially filled with a stiffening material such that air gaps within the housing external to the sensor and the diaphragm chamber are substantially eliminated. The stiffening material has an elastic modulus that enables the housing to substantially resist deformation in response to body-noise.

It would be appreciated that a microphone in accordance with embodiments of the present invention may be filled with a stiffening material in a number of different manners. For example, in certain embodiments, the stiffening material may be injected or injection molded into the housing. In other embodiments, a stiffening material is introduced in a liquid form, and is cured to form a solid material.

As noted above, a microphone in accordance with embodiments of the present invention includes a transducer or sensor which detects vibration, deflection or other movement of a diaphragm. It would be appreciated that any sensor which is capable of sensing a pressure variation in the diaphragm chamber as result of diaphragm vibration, or of directly sensing a deflection of the diaphragm may used in embodiments of the present invention. Exemplary such sensors include, but are not limited to, electret, piezoelectric, optical, condenser/capacitor microphone sensing elements, liquid sensors, sensors based on electromagnetic induction, such as magnetostriction, ribbon, moving coil, etc. As such, microphones in accordance with embodiments of the present invention may be referred to as any one of a condenser/capacitor microphone, electret microphone, dynamic microphone, piezoelectric microphone, etc.

As noted above, a sensor is disposed adjacent an end of the diaphragm chamber opposing the diaphragm. In specific embodiments of the present invention, in response to movement of the diaphragm a pressure change is caused in the diaphragm chamber and the sensor detects the deflection of the diaphragm by sensing the pressure change in the chamber. In these embodiments, the sensor utilizes the detected pressure change to generate an electrical signal representative of the received sound.

Embodiments of the present invention have been primarily described with reference to a microphone having a sensor disposed adjacent an end of the diaphragm chamber opposing the diaphragm. However, it would be appreciated that microphones in accordance with embodiments of the present invention may have a number of different arrangements. For example, in one alternative embodiment of the present invention, a microphone comprises multiple diaphragms, sensors and diaphragm chambers. These different components may all be positioned in a single housing or in separate housings. Each housing is substantially filled with a stiffening material.

Furthermore, implantable hearing prostheses may include multiple microphones of the present invention. In such embodiments, the hearing prosthesis may utilize adaptive algorithms, such as a phased array algorithm, or other sound processing techniques to generate an output representing a desired sound signal. As would be appreciated by those of skill in the art, an implantable microphone in accordance with embodiments of the present invention may also be utilized in cooperation with external devices, such as an external microphone.

In still other arrangements, one or more vibration sensors may be combined with one or more microphones of the present invention. In such embodiments, the output of the vibration sensor may be used as an input for an adaptive algorithm to at least partially cancel body-noise. The vibration sensor may be located in the main implantable component, in a separate housing, in multiple separate housings, etc. In specific embodiments, the vibration sensor is located in a separate housing which is substantially filled with a stiffening material to ensure that the vibration sensor directly measures the acceleration of the skull and is not influenced by any deformation of the housing as could potentially occur with a hollow housing.

As noted above, a microphone in accordance with embodiments of the present invention may be positioned at least partially inside another implantable component, or may used as a stand alone element. A stand alone microphone in accordance with embodiments of the present invention may be secured to the recipient or other implantable component using any method known in the art. For example, in certain embodiments a microphone in accordance with embodiments of the present invention is secured to the recipient's skull so that the diaphragm is adjacent the recipient's skin/tissue. A microphone of the present invention may be adapted to sit within a recess in the recipient's skull, anchored to the bone using screws, secured internally by stitching, or by any other suitable arrangement. Furthermore, any shape for the microphone housing may be chosen so long as the shape is suitable and safe for implantation.

The invention described and claimed herein is not to be limited in scope by the specific preferred embodiments herein disclosed, since these embodiments are intended as illustrations, and not limitations, of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. All patents and publications discussed herein are incorporated in their entirety by reference thereto.

What is claimed is:

1. An implantable microphone, comprising:
   a housing having a diaphragm chamber formed therein, and an aperture extending from the exterior surface of the housing to the chamber;
   a diaphragm disposed on the exterior of the housing so as to seal the aperture, and configured to vibrate in response to sound signals;
   a sensor positioned adjacent an end of the chamber opposing the diaphragm, and configured to detect vibration of the diaphragm, and to generate electrical signals based thereon; and
   a stiffening material substantially filling the regions of the housing external to the sensor and the diaphragm chamber such that air gaps within the filled regions of the housing are substantially eliminated,
   wherein the stiffening material has an elastic modulus that enables the housing to substantially resist deformation thereof in response to body-noise.

2. The implantable microphone of claim 1, wherein the stiffening material has a density such that the microphone has a mass that substantially prevents movement thereof in response to body-noise.

3. The implantable microphone of claim 1, further comprising:
   an isolation member disposed about the sensor configured to mechanically isolate the sensor from the stiffening material.

4. The implantable microphone of claim 1, wherein the stiffening material comprises a biocompatible epoxy.

5. The implantable microphone of claim 1, wherein the stiffening material comprises a thermoset polymer.

6. The implantable microphone of claim 1, wherein the stiffening material comprises a thermoplastic polymer.

7. The implantable microphone of claim 1, wherein the stiffening material is selected from the group comprising: vulcanized rubber, synthetic rubber, silicone rubber and natural rubber.

8. The implantable microphone of claim 1, wherein the sensor comprises a capacitive plate which detects vibration of the diaphragm.

9. The implantable microphone of claim 1, wherein the sensor comprises a pressure sensitive transducer to detect pressure changes in the diaphragm chamber.

10. The implantable microphone of claim 3, wherein the isolation member is formed of silicone.

11. The implantable microphone of claim 1, wherein the housing is formed from a solid piece of biocompatible material to receive the sensor element and to form the diaphragm chamber.

12. The implantable microphone of claim 1, wherein the housing is shaped to fit closely to the sensor.

13. A method of manufacturing an implantable microphone, comprising:
   providing a housing having a diaphragm chamber formed therein, and an aperture extending from the exterior surface of the housing to the chamber;
   positioning a sensor in the housing so as to be adjacent an end of the diaphragm chamber opposing the diaphragm; and
   substantially filling the housing with a stiffening material such that air gaps within the filled regions of the housing are substantially eliminated, wherein the stiffening material has an elastic modulus that enables the housing to substantially resist deformation thereof in response to body-noise.

14. The method of claim 13, wherein substantially filling the housing with the stiffening material comprises:
   filling the housing with a stiffening material having a density that enables the microphone to resist movement in response to body-noise.

15. The method of claim 13, wherein substantially filling the housing with the stiffening material comprises:
   introducing the stiffening material in a liquid form; and curing the liquid stiffening material.

16. The method of claim 13, further comprising:
   positioning an isolation member about the sensor prior to substantially filling the housing with the stiffening material.

17. The method of claim 13, wherein providing the housing having a diaphragm chamber, comprises:
   forming the housing from a solid piece of biocompatible material so that the housing closely fits the sensor.

18. An implantable microphone, comprising:
   a housing having a diaphragm chamber formed therein, and an aperture extending from the exterior surface of the housing to the chamber;
   a diaphragm disposed on the exterior of the housing so as to seal the aperture, and configured to vibrate in response to sound signals;
   a sensor positioned adjacent an end of the chamber opposing the diaphragm, and configured to detect vibration of the diaphragm, and to generate electrical signals based thereon; and
   a stiffening material substantially filling the regions of the housing external to the sensor and the diaphragm chamber such that air gaps within the filled regions of the housing are substantially eliminated,
   wherein the stiffening material has a density such that the microphone has a mass that substantially prevents movement thereof in response to body-noise.

19. The implantable microphone of claim 18, wherein the stiffening material has an elastic modulus that enables the housing to substantially resist deformation thereof in response to body-noise.

20. The microphone of claim 18, further comprising:
an isolation member disposed about the sensor configured to mechanically isolate the sensor from the stiffening material.

21. The microphone of claim 18, wherein the implantable microphone is positioned in the main implantable module.

22. The microphone of claim 18, wherein the implantable microphone is physically separate from the main implantable module.

* * * * *